United States Patent
Lu et al.

(10) Patent No.: US 8,510,539 B2
(45) Date of Patent: Aug. 13, 2013

(54) SPILLING METHOD INVOLVING REGISTER FILES BASED ON COMMUNICATION COSTS AND USE RATIO

(75) Inventors: Chia Han Lu, Hsinchu (TW); Chung Ju Wu, Taipei (TW); Jenq Kuen Lee, Hsinchu (TW)

(73) Assignee: National Tsing Hua University, Hsinchu (TW)

(*) Notice: Subject to any disclaimer, the term of this patent is extended or adjusted under 35 U.S.C. 154(b) by 557 days.

(21) Appl. No.: 12/829,711

(22) Filed: Jul. 2, 2010

(65) Prior Publication Data
US 2011/0004741 A1  Jan. 6, 2011

(30) Foreign Application Priority Data
Jul. 6, 2009 (TW) .................. 98122720 A

(51) Int. Cl.
*G06F 9/44* (2006.01)
(52) U.S. Cl.
USPC .............. 712/228; 712/24; 717/149; 717/151
(58) Field of Classification Search
USPC .................. 712/228, 220, 24; 717/149, 151
See application file for complete search history.

(56) References Cited

U.S. PATENT DOCUMENTS

| | | | |
|---|---|---|---|
| 2005/0102658 A1* | 5/2005 | Li et al. | 717/140 |
| 2005/0144424 A1 | 6/2005 | De Vries et al. | |
| 2005/0210457 A1* | 9/2005 | Guilford | 717/140 |
| 2007/0016758 A1 | 1/2007 | Tremblay et al. | |
| 2007/0150700 A1* | 6/2007 | Dally et al. | 712/22 |
| 2008/0005722 A1* | 1/2008 | Matsuzaki | 717/122 |
| 2008/0052694 A1* | 2/2008 | Lee et al. | 717/151 |

FOREIGN PATENT DOCUMENTS

| | | |
|---|---|---|
| TW | 200717320 A | 5/2007 |
| TW | 200809604 A | 2/2008 |
| TW | 200926050 A | 6/2009 |

OTHER PUBLICATIONS

Chang et al., "PAC DSP Core and Application Processors", Jul. 2006, 2006 IEEE International Conference on Multimedia and Expo, p. 289-292.*
Lin et al., "An efficient VLIW DSP architecture for baseband processing", Oct. 2003, Proceedings 21st International Conference on Computer Design, p. 1-6.*
Hennessy et al., "Computer Architecture", 3rd Ed., 2003, Section 2.15, p. 10.*

* cited by examiner

*Primary Examiner* — Andrew Caldwell
*Assistant Examiner* — Yuqing Xiao
(74) *Attorney, Agent, or Firm* — WPAT, P.C.; Anthony King

(57) ABSTRACT

A spilling method in register files for a processor is proposed. The processor with Parallel Architecture Core structure includes multiple clusters and a memory. Each cluster includes multiple function units (M-Unit and I-Unit), multiple local register files and a global register file. The local register files are used by the multiple function units, respectively. For a specified live range, the method includes calculating communication costs of the local register files and the global register file in each cluster, and communication cost of the memory for spilling the live range when spilling occurs; calculating use ratios of the local register files and the global register file in each cluster, and use ratio of the memory for the live range; and selecting one of the local register files and the global register file in each cluster and the memory for spilling the live range based on the communication costs and use ratios.

9 Claims, 5 Drawing Sheets

SPILLING METHOD INVOLVING REGISTER FILES BASED ON COMMUNICATION COSTS AND USE RATIO

BACKGROUND OF THE INVENTION (A) Field of the Invention

The present invention is related to a spilling method in register files for a microprocessor, and more particularly, to a spilling method in register files applied to a Parallel Architecture Core (PAC) processor.

(B) Description of the Related Art

Nowadays, digital signal processors (DSP) are widely used for apparatuses that need a large amount of computation such as mobile apparatuses. As the development of communication technology focuses on high performance and low power consumption, DSPs with large communication source, limited information paths and register storage capability have been developed. The DSP computation sources are divided into plural clusters that are associated with specific local register files to reduce hardware complexity.

Registers have the function of storing data and need to be efficiently used for achieving high performance during operation. The selection of language device to allocate the instruction to the register and the processing of moving the data using the language device are called "register allocation." The register allocation is crucial to the complier's performance. Improper allocation will degrade the script code size and operation time performance.

Pages 47 to 57, Vol. 6 of "Computer Languages," written by Chaitin et al. and U.S. Pat. No. 4,571,678 entitled "Register Allocation and Spilling via Graph Coloring" show register allocation using graph coloring, in which program instruction from the definition to the output is the so-called live range, and the corresponding registers are assigned different colors for the overlap portion of the live range. Different colors indicate different registers.

When the number of registers is insufficient to store the live range of the program instruction, "spilling" occurs. Traditionally, the live range is changed to be stored in an external memory when spilling occurs. However, storage in the external memory has high communication cost, and causes decreased processor performance.

SUMMARY OF THE INVENTION

The present invention provides a spilling method in register files for a processor, which is primarily applied to Very Long Instruction Word (VLIW) digital signal processor (DSP) with Parallel Architecture Core (PAC). When instructions spill, live ranges can be stored in free register files in the PAC, instead of being stored in memories as in the prior art, so as to increase processor efficiency.

According to one embodiment of the present invention, a spilling method in register files for a processor is proposed. The processor has a parallel architecture core (PAC), i.e., the processor includes a first cluster, a second cluster and a memory. Each of the first and second clusters includes a first function unit (e.g., M-Unit), a second function unit (e.g., I-Unit), a first local register file, a second local register file and a global register file. The first and second local register files are used by the first and second function units, respectively. For a specified live range, the spilling method includes the steps of calculating communication costs of the first local register file, the second local register file and the global register file in each of the first and second clusters, and communication cost of the memory for spilling the live range when spilling occurs; calculating use ratios of the first local register file, the second local register file and the global register file in each of the first and second clusters, and use ratio of the memory for the live range; selecting one of the first local register file, the second local register file and the global register file in each of the first and second clusters and the memory for spilling the live range based on the communication costs and the use ratios.

In an embodiment, weighted costs of the first local register file, the second local register file and the global register file in each of the first and second clusters and the memory are calculated based on the communication costs and the use ratios, in which the one with minimum weighted cost is used for storing the spilled instruction. The weighted cost is a function of use ratio and communication cost.

DETAILED DESCRIPTION OF THE INVENTION

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

This embodiment is primarily applied to VLIW DSP with PAC architecture.

Figure 1:
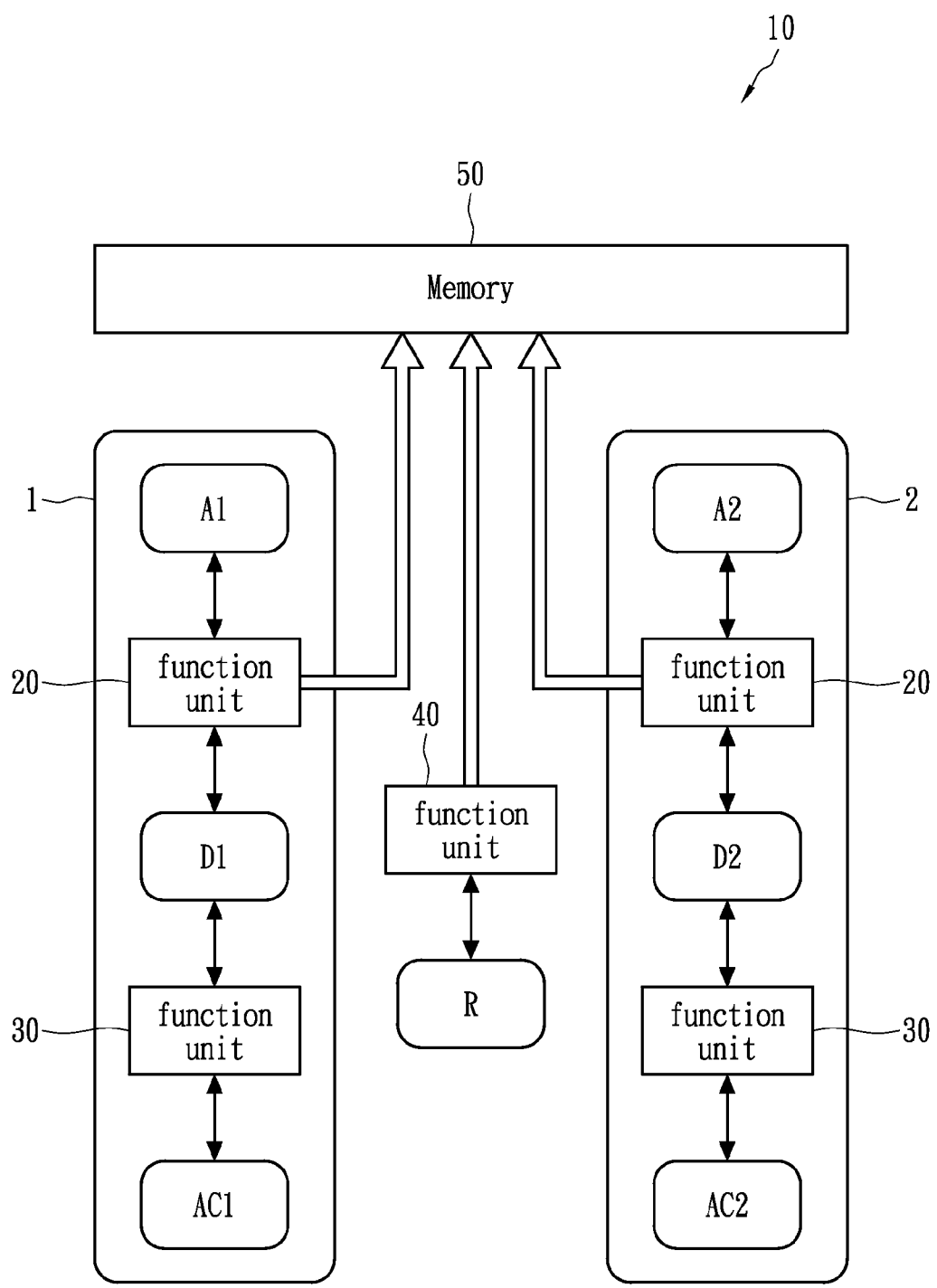
FIG. 1 illustrates the processor architecture in accordance with the present invention.

FIG. 1 shows a PAC processor 10 including a first cluster 1 and a second cluster 2. The cluster 1 and the cluster 2 each include a first function unit 20, a second function unit 30, a first local register file A1 or A2 connected to the first function unit 20, a second local register file AC1 or AC2 connected to the second function unit 30, and a global register file D1 or D2. The PAC processor 10 further includes an independent third function unit 40 outside the first cluster 1 and the second cluster 2, and a third local register file R connected to the third function unit 40. The first function units 20 of the first cluster 1 and the second cluster 2 and the third function unit 40 are connected to a memory 50.

The first function unit 20 is a load/store unit, the second function unit 30 is an arithmetic unit, and the third function unit 40 is a scalar unit. The third function unit 40 dominates branch operations, and can perform simple data access and address computation. The first local register files A1, A2, the second local register files AC1, AC2 and the third local register file R can only be used by the load/store unit 20, the arithmetic unit 30 and the scalar unit 40, respectively.

Traditionally, when "spilling" occurs during register allocation, live ranges are transmitted to and stored in the memory 50. However, the storage in the memory 50 increases access cost and reduces the performance of the processor 10. The present application discloses a method to find out the register file that can be used for storing live ranges when spilling, so that the live ranges can be stored in the register file instead of the memory that was used for storage previously. Accordingly, the access cost can be reduced and the processor performance can be increased.

Figure 2:
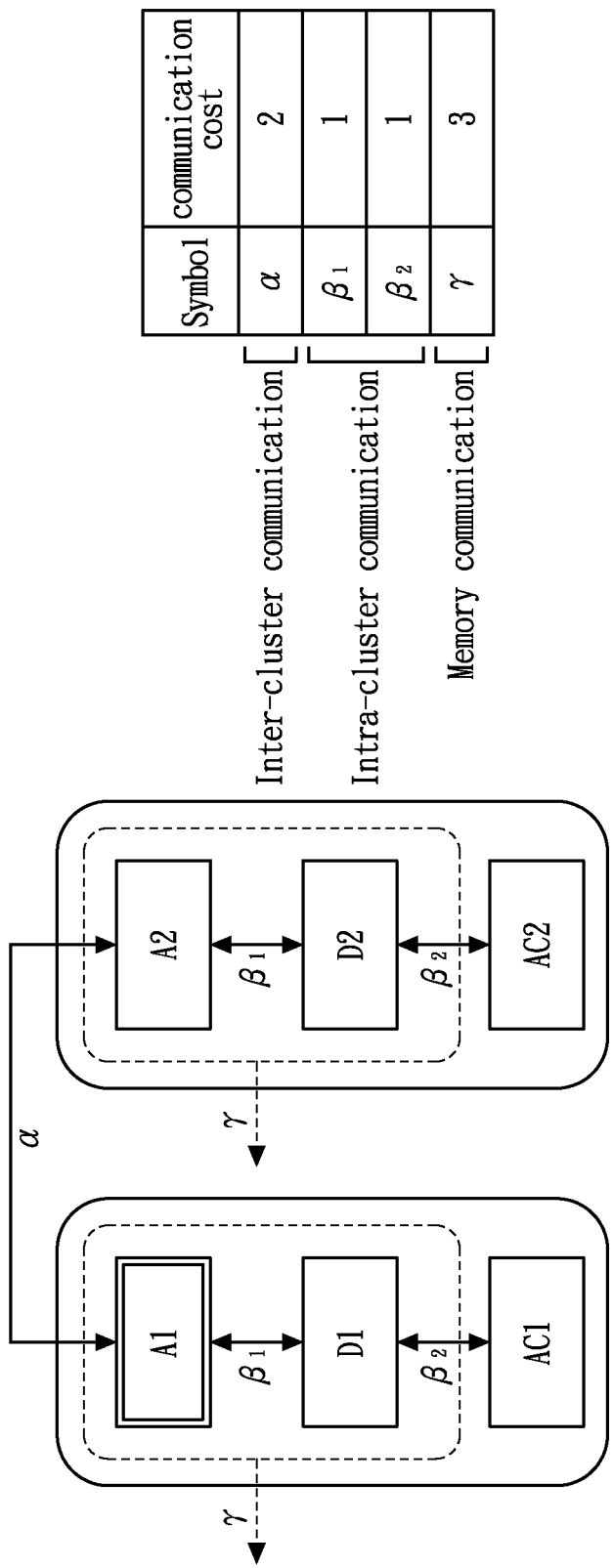
FIG. 2 illustrates the setting of the communication costs of an instruction of the register files in accordance with an embodiment of the present invention.

In FIG. 2, the types of the communication costs are defined first. The communications between the global register file D1 and the first local register file A1, and between the global register file D1 and the second local register file AC1 in the cluster 1, are denoted by β1 and β2, respectively. Likewise, the communications between the global register file D2 and the first local register file A2 and between the global register file D2 and the second local register file AC2 in the cluster 2 are denoted by β 1 and β2, respectively. The communication between the cluster 1 and the cluster 2 is denoted by α. Communication with the external memory 50 is denoted by γ. The communication between the register files in the same cluster (intra-cluster communication) is easier, the communication in different clusters (inter-cluster communication) is relatively difficult, and the communication with the memory has the highest cost. In this embodiment, the communication cost or cycle count is weighted. The communication cost α between different clusters is equal to 2, the communication cost β1 or β2 in the same cluster is equal to 1, and the communication cost γ is equal to 3, in which a larger value represents higher communication cost.

Figure 3:
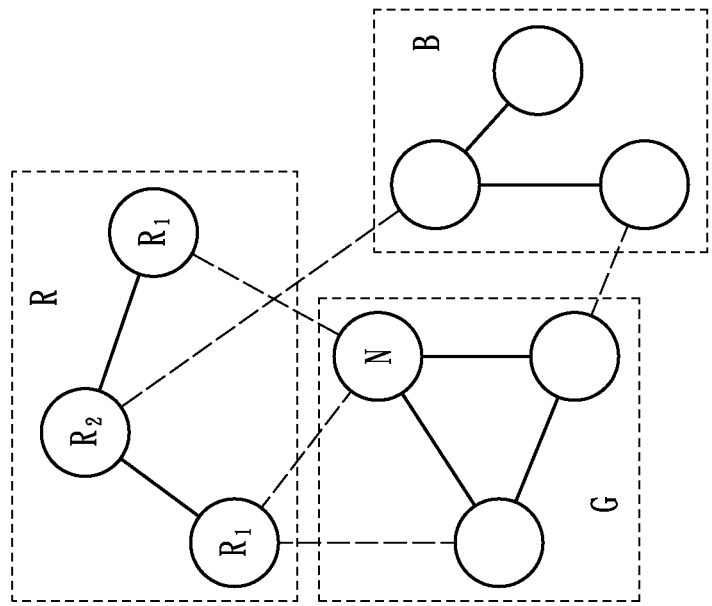
FIG. 3 and FIG. 4 illustrate the calculation of the use ratio of the register file in accordance with an embodiment of the present invention.
Figure 3:
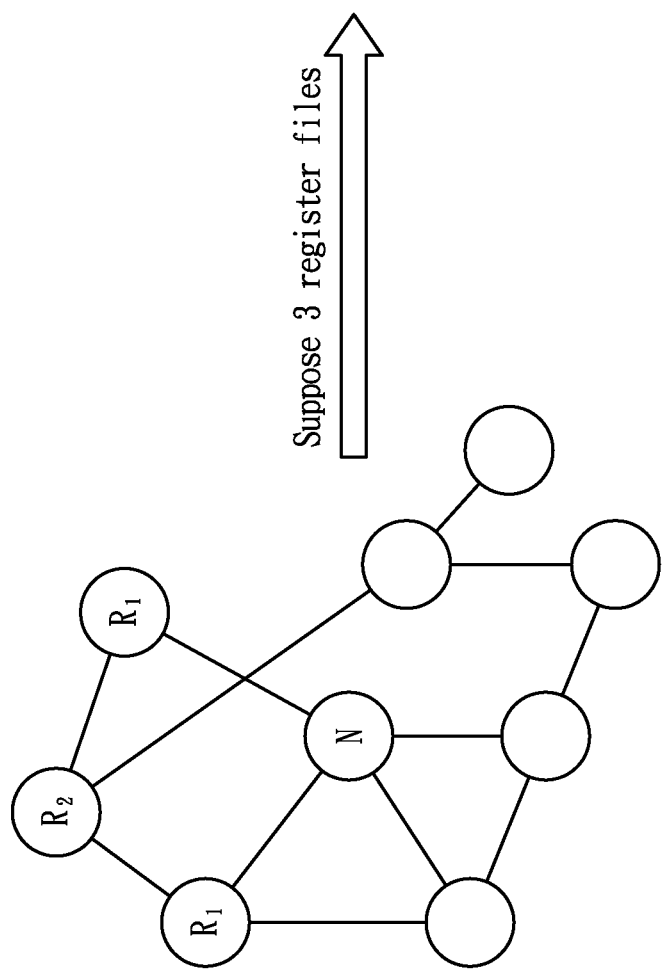

In FIG. 3, each of the nodes including nodes (N, $R_1$, $R_2$, and $R_3$) represents a live range from the first definition to the last use in a program instruction. Assuming three register files R, G and B can be used (R, G, B also represent three different colors, i.e., red, green and blue, in this embodiment), all of the nodes are distributed in the three register files R, G and B, as shown in FIG. 3. The connection of the nodes in the same file register is denoted by solid lines, whereas the connection of the nodes in different file registers is denoted by dashed lines. The solid line represents local interference, and the dashed line represents global interference.

Figure 4:
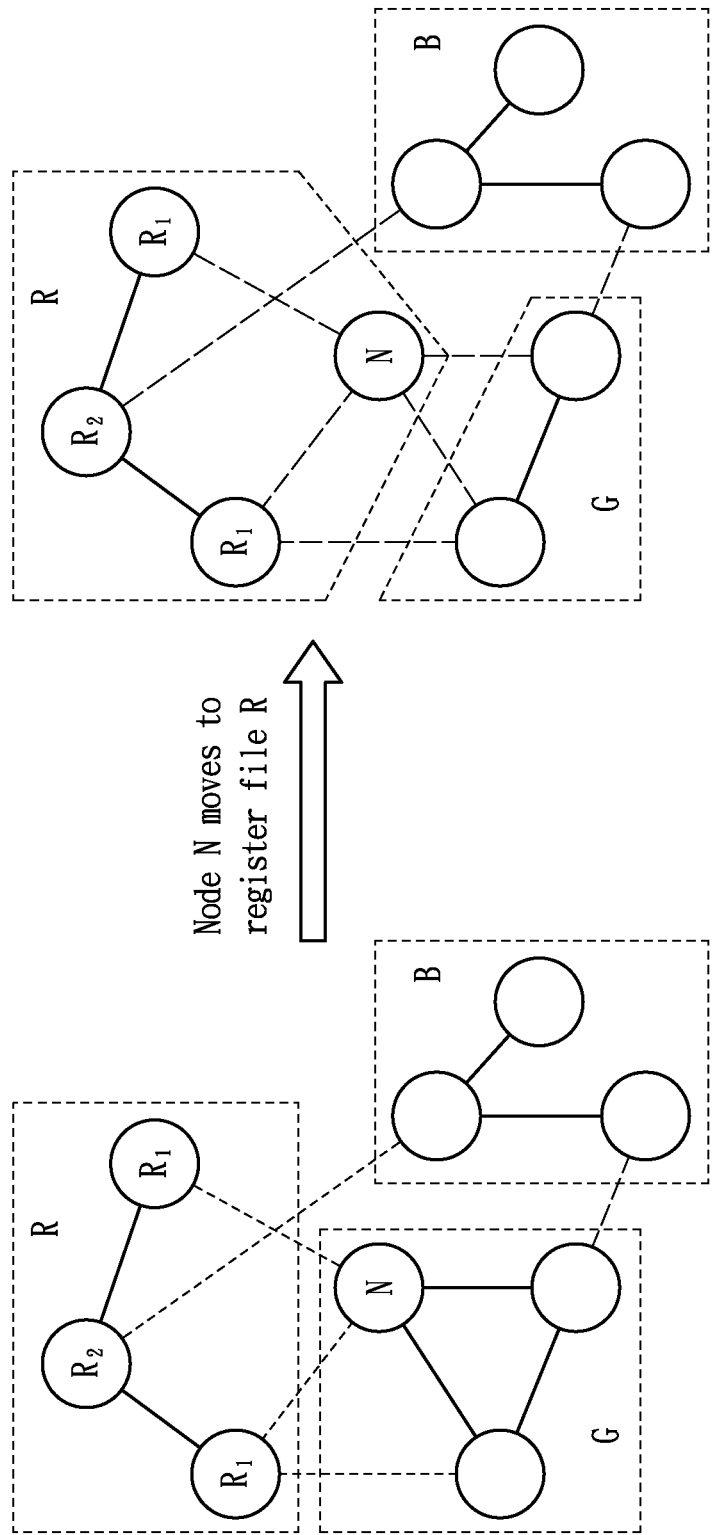

In FIG. 4, assuming that the node N initially located in the register file G moves to the register file R, the connections between node N and the nodes in the register file G form global interference and therefore are changed from solid lines to dashed lines. The number of the dash connections of the node N and two nodes R1 in the register file R is two.

According to the present invention, use ratio is defined by the equation:

use ratio=(the number of all registers−the number of free registers)/the number of all registers.

The free registers are the registers that can be used for storage. In this embodiment, the use ratio of the register file R can be calculated by the following two methods:

(1) The number of the free registers is equal to the number of all registers in the register file R minus the number of dashed line connections of the node N in the register file R. If the number of all registers in the register file R is equal to 2, and the number of dashed line connections to the node N in the register file R (connecting to $R_1$) is 2, then the use ratio of the register file R is (2−0)/2=1.0.

(2) The number of the free registers is equal to the number of all registers in the register file R minus the number of colors of the nodes connecting to the node N in the register file R. If the number of all registers in the register file R is equal to 2, and the color of the two nodes $R_1$ connecting to the node N in the register file R is red, then there is only one color. Accordingly, the use ratio is (2−1)/2=0.5.

The use ratio is a value between 0 and 1; a higher use ratio indicates that the usage probability of the corresponding register file is lower.

The use ratio and the communication cost are considered together and the weighted cost of each of the register files can be calculated by the following equation:

weighted cost=communication cost×(1+use ratio)$^2$.

Figure 5:
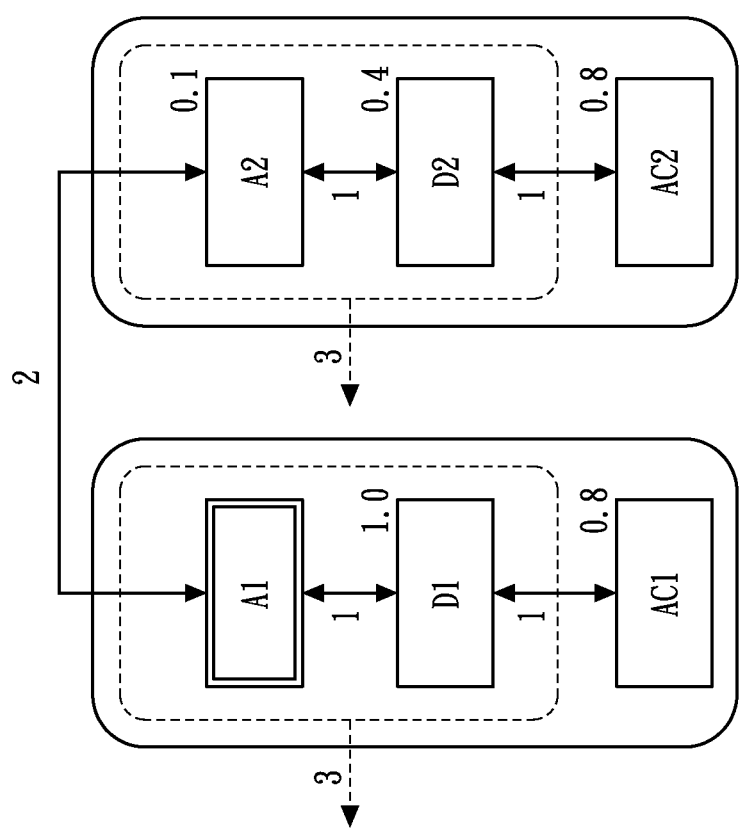
FIG. 5 illustrates the communication costs and the use ratio of the register file of PAC architecture in accordance with an embodiment of the present invention.

As shown in FIG. 5, if spilling occurs in the register file A1, the spilled live range can be moved to another register file or the memory. FIG. 5 demonstrates the process in which the invention determines the destination for the spilled live range. Such register files and the memory are listed below, in which the weighted costs for the register file and memory serving as candidates for storing the live range are calculated according to the above equation. Because in the PAC the register file A1 does not communicate with AC1 and AC2, the communication cost is infinite (∞). The use ratio of the memory is set to zero. FIG. 5 marks the communication costs and the use ratios of the register files and the memory, which are shown in the table below.

|  | Use ratio | Communication cost | Weighted cost |
| --- | --- | --- | --- |
| A1 | — | — | — |
| D1 | 1.0 | 1 | 4.0 |
| AC1 | 0.8 | ∞ | ∞ |
| A2 | 0.1 | 2 | 2.4 |
| D2 | 0.4 | 2 | 3.9 |
| AC2 | 0.8 | ∞ | ∞ |
| Memory | 0.0 | 3 | 3.0 |

According to the above embodiment, the weighted cost 2.4 is the minimum if the spilled live range is stored in the register file A2. Therefore, A2 is selected to be the register file for storing live range (node).

According to the present invention, free register files can be fully utilized to store the spilled live ranges, so as to replace the traditional method of storing live ranges in the memory and increase processor performance.

The above-described embodiments of the present invention are intended to be illustrative only. Numerous alternative embodiments may be devised by those skilled in the art without departing from the scope of the following claims.

What is claimed is:

1. A spilling method in register files for a processor, the processor comprising a first cluster, a second cluster and a memory, each of the first and second clusters comprising a first function unit, a second function unit, a first local register file, a second local register file and a global register file, the first and second local register files being used by the first and second function units, respectively;

for a live range, the method includes the steps of:
  calculating communication costs of the first local register file, the second local register file and the global register file in each of the first and second clusters and communication cost of the memory for spilling the live range;
  calculating use ratios of the first local register file, the second local register file and the global register file in each of the first and second clusters, and use ratio of the memory for the live range;
  selecting one of the first local register file, the second local register file and the global register file in each of the first and second clusters and the memory for spilling the live range based on the communication costs and the use ratios.

2. The spilling method of claim 1, wherein a first communication cost is used if the live range is spilled to a same cluster in which spilling occurs, a second communication cost is used if the live range spilled to a cluster other than the cluster in which spilling occurs, and a third communication cost is used if the live range spilled to the memory; the third communication cost is larger than the second communication cost, and the second communication cost is larger than the first communication cost.

3. The spilling method of claim 2, wherein the first communication cost is 1, the second communication cost is 2, and the third communication cost is 3.

4. The spilling method of claim 1, wherein weighted costs of the first local register file, the second local register file and the global register file in each of the first and second clusters and weighted cost of the memory are calculated based on the communication costs and the use ratios, in which the first local register file, the second local register file, the global register file or the memory with minimum weighted cost is used for spilling the live range, and the weighted cost is a function of use ratio and communication cost.

5. The spilling method of claim 4, wherein the weighted cost of each of the first local register file, the second local register file, the global register file, and the memory is calculated by the equation:

$$\text{weighted cost} = \text{communication cost} \times (1 + \text{use ratio})^2.$$

6. The spilling method of claim 1, wherein the use ratio of each of the first local register file, the second local register file, and the global register file is calculated by the equation:

$$\text{use ratio} = (\text{the number of all registers} - \text{the number of free registers})/\text{the number of all registers}.$$

7. The spilling method of claim 1, wherein the use ratio of the memory is set to zero.

8. The spilling method of claim 1, wherein the communication cost between the first local register file and the second local register file is infinite.

9. The spilling method of claim 1, applied to a Very Long Instruction Word (VLIW) digital signal processor.

* * * * *